Nov. 6, 1962 A. F. HARDMAN ETAL 3,062,825
PROCESS OF PREPARING CERTAIN THIAZOLE DISULFIDES
Filed Sept. 29, 1960
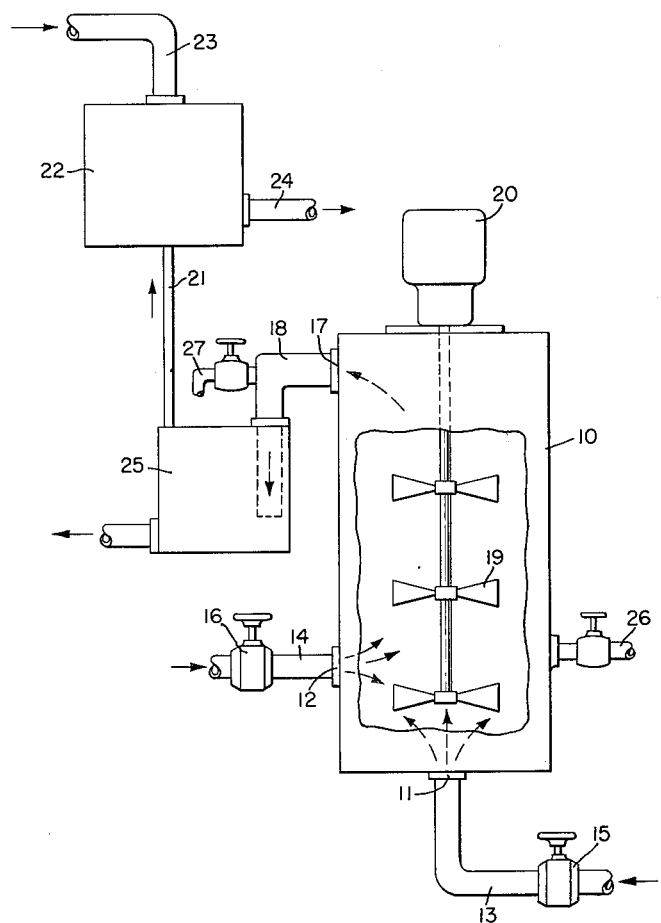
*INVENTORS*
ALBERT F. HARDMAN
BY JAMES J. HAMILL
*J. B. Holden*
ATTORNEY

United States Patent Office 3,062,825
Patented Nov. 6, 1962

3,062,825
PROCESS OF PREPARING CERTAIN
THIAZOLE DISULFIDES
Albert F. Hardman, Akron, and James J. Hamill, Cuyahoga Falls, Ohio, assignors to The Goodyear Tire & Rubber Company, Akron, Ohio, a corporation of Ohio
Filed Sept. 29, 1960, Ser. No. 59,308
8 Claims. (Cl. 260—306.5)

This invention relates to polysulfides having excellent properties of dispersion in rubbers and to a process for preparing such polysulfides. More particularly, this invention is concerned with improvements in the nitrite oxidation process for converting thiazoles to disulfides.

In the customary practice of oxidizing thiazoles to disulfides by means of a nitrite, the insoluble thiazole is slurried in water after which a nitrite, such as sodium nitrite, is dissolved in the slurry. Thereafter, a mineral acid is slowly added to the mixture of insoluble thiazole and nitrite. The reaction between the acid and nitrite releases nitrous acid which forms oxides of nitrogen which in turn oxidizes the thiazole to a disulfide. If desired, air may be blown into the mixture to replace part of the nitrite necessary for oxidation. After sufficient mineral acid has been slowly added to the reaction mixture and oxidation has been substantially completed, the precipitated disulfide is removed from the reaction batch by filtration after which it is washed and dried.

Although used extensively in commercial production, this conventional nitrite oxidation process is subject to certain objections. Because the oxidation takes place at the surface of a solid particle, e.g., the insoluble thiazole, oxidation proceeds rather slowly and the oxidation product formed, e.g., the disulfide, is formed in finely divided, flaky condition. These flakes are light, dusty, and quite bulky so that they are difficult to store, ship, and use. For example, when compressed on a rubber mill in a rubber batch, the particles tend to fuse together to form aggregates which are difficult to disperse in the rubber.

It is an object of this invention to provide disulfides which can be readily dispersed in rubber. It is another object of this invention to provide improvements in the nitrite oxidation process for converting thiazoles to disulfides. It is a further object of this invention to provide an improved nitrite oxidation process for converting thiazoles to disulfides which have enhanced dispersibility in rubber.

This invention is concerned with a new process for oxidizing thiazole compounds to disulfides by means of an oxidizing agent, such as a nitrite, in a rapid, inexpensive manner which provides disulfides having greatly improved characteristics of dispersibility in rubber and higher bulk densities. This process comprises the steps of preparing a solution of a water soluble salt of a thiazole and an oxidizing agent, e.g., a nitrite, and thereafter mixing the solution of thiazole salt and oxidizing agent with a mineral acid using carefully controlled agitation to produce fine liquid droplets of thiazole dispersed in the acid solution. The reaction of the nitrite oxidizing agent with the acid results in the formation of nitrous acid which quickly oxidizes the droplets of thiazole to the corresponding disulfide. The disulfide is believed to remain momentarily in liquid globular form before it crystallizes to form solid globular shaped particles of disulfide. By subjecting portions of the reaction mixture to microscopic examination the size of the liquid globular shaped droplets of disulfide which are present in the solution can be determined and their size controlled by the rate of introduction of the reacting solutions into the reaction zone and by controlling the degree of agitation to which the solutions are subjected. By controlling the size of the liquid globular shaped droplets of disulfide it is possible to produce a disulfide product having comparatively uniform particles of substantially greater density than the flaky, dusty disulfides which have been produced in the past.

The preferred process for producing disulfides in accordance with this invention is further characterized by the use of sufficient oxidizing agent to oxide substantially all of the thiazole compound to polysulfide without the addition of air or other oxygen-containing gases or oxygen-releasing compositions. However, disulfides having very satisfactory dispersion properties in rubber are achieved when a small portion, e.g., less than 10%, of the required nitrite is replaced with other oxidizing agents, e.g., air. When the solution of thiazole salt and nitrite oxidizing agent, which customarily is in a water solution, is mixed with the mineral acid under carefully controlled condtions, dense, compact particles of disulfide form which float to the surface of the reaction solution where they can be easily and continuously separated from the reaction solution and dried, thus removing the disulfide product from the reaction zone before it is subjected to excessive agitation. The disulfides thus produced disperse much more readily and completely in rubber than previously known thiazole disulfide accelerators.

When the solution of soluble thiazole salt and nitrite salt are mixed with a slight excess of mineral acid while agitating the acid solution at a rate sufficient to disperse the thiazole solution in the acid in discrete droplets, the formed nitrous acid and thiazole droplets are in immediate and intimate contact so that oxidation is almost instantaneous. Also, the disulfides are initially precipitated in the form of liquid droplets instead of a solid. These droplets naturally tend to form in globular shape according to the laws of physics. These droplets quickly crystallize under suitable conditions of temperature and agitation to form particles of disulfide roughly similar in size and shape to the original liquid globules. By examining portions of the reacting solutions under a microscope the size of the liquid disulfide globules formed can be determined and the rate of introduction of the reacting solutions into the reacting zone and the degree of agitation to which they are subjected varied in order to produce liquid disulfide globules wherein the majority of the liquid globules are between 0.5 and 25 microns in diameter, the preferred globule size being between 1 and 10 microns in diameter. In this manner, a readily dispersible disulfide is produced which can be stored, marketed and used in a more facile manner than similar disulfides produced heretofore. These disulfide particles have much greater bulk density, e.g., occupy less space per pound, do not tend to pack together under pressure like the finer compounds, and disperse much more rapidly and completely in rubber compounds.

In adjusting the variables which can be readily controlled in order to produce liquid disulfide globules of the desired size the following factors should be considered. With the agitator stirring at a fixed r.p.m. increasing the rate at which the reacting solutions are brought together in the reaction zone will result in larger liquid globules being formed, conversely decreasing the rate at which the reacting solutions are brought together will result in the formation of smaller liquid globules of disulfide. When the reacting solutions are introduced to the reaction zone at a constant rate increasing the speed of the agitator will produce smaller liquid globules of disulfide, conversely decreasing the speed of the agitator will result in the formation of larger liquid globules of disulfide.

The invention can be practiced on a batch basis or on a continuous basis. Because of the much greater rate of production and because the reaction rates can be easily controlled, the continuous production method is preferred in the practice of the invention. The accompanying drawing is in the nature of a flow chart which illustrates the type of apparatus which may be employed in the continuous process of this invention wherein thiazole salts are oxidized to disulfides under accurately controlled conditions. In the drawing, a reactor 10 is shown which has an opening 11 in or near the bottom whereby a solution of one or more thiazole salts and one or more nitrite salts can be introduced into the reactor. The reactor also contains another opening 12 in or near the bottom of the reactor whereby the mineral acid is added to the reactor. The feed lines 13 and 14 should be placed in such position that the thiazole salt-nitrite salt solution and acid are in immediate contact. Control valves 15 and 16 located in feed lines 13 and 14 are designed for easy adjustment and may conveniently be remotely controlled solenoid or diaphragm valves which are used to adjust the rate of flow of the thiazole-nitrate and acid solutions into the reactor. Another and somewhat larger opening 17 is provided near the top of the reactor in order to receive a discharge line 18 through which the precipitated disulfide reaction mixture is discharged. A desirable characteristic of the practice of this invention is that the process does not require pressure, although a pressure system can be used, so that the reactor may be of relatively light materials and therefore of economical construction. Agitator 19 is driven with an electric motor 20 which can be a variable speed electric motor or the agitator can be equipped with a suitable gearing arrangement that will permit its rotational speed to be readily varied over a relatively wide range in order to permit flexibility in the degree of agitation to which the solutions in the reactor are subjected. Sampling line and valve assemblies 26 and 27 located respectively in the reactor 10 and discharge line 18 permit samples of the reaction mixture to be conveniently obtained for microscopic examination at any time during the reaction. When the reaction mixture containing the precipitated disulfides is discharged through the discharge line 18, formed nitrogen oxides, primarily NO gas, can be removed by means of a disengaging tank 25 connected to vent line 21. The nitrogen oxides may be discharged into the atmosphere but preferably may be mixed with air and passed through a scrubber 22 containing a line 23 in the top through which can be fed into the scrubber a suitable alkali, such as sodium hydroxide. The alkali reacts with the oxide stream to form salts of nitrous acid, e.g., sodium nitrite, which can be discharged through line 24 and recycled into the process.

The useful thiazole salts may be described as soluble salts conforming to the following structure:

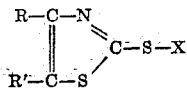

wherein R and R' are hydrogen or the same or different alkyl radicals having from 1 to 10 carbon atoms, carbonyl radicals, carboxyl radicals, aryl radicals having from 6 to 12 carbon atoms, acyl radicals, ether radicals, cycloaliphatic radicals or radicals wherein R and R' together form a ring which may be saturated or unsaturated and wherein X represents a soluble salt-forming radical, such as an alkali metal, an alkaline earth metal, and other soluble salt-forming radicals. In the practice of this invention, the monovalent metal radicals, such as sodium, potassium, and lithium, are preferred.

Examples of the suitable thiazoles are 2-mercapto-4,5-dimethyl thiazole, 2-mercapto-4-phenyl thiazole, 2-mercapto-4-methyl-5-carbethoxythiazole, 2-mercapto-4-methyl-5-acetyl thiazole, 2-mercaptobenzothiazole, 2-mercapto naphthothiazole, 2-mercapto-5-chlorobenzothiazole, 2-mercapto-6-nitro-benzothiazole, etc.

The temperature at which the reactions are completed can be varied over a relatively wide range between the freezing and boiling temperature of the reacting solutions. Low temperatures can be used, but it is generally desirable to use a temperature that will give reasonably fast reaction rates providing the reactants and the resulting product are stable at higher temperatures. The preferred temperature of the reacting mixture when oxidizing thiazoles will customarily be between 40° C. and 75° C.

The mineral acids which can be used in the practice of this invention are the well-known mineral acids such as sulfuric acid, hydrochloric acid, phosphoric acid, nitric acid, etc.

The nitrite oxidizing agents which are to be employed in the practice of this invention include the water soluble alkali and alkaline earth metal nitrites, a preferred species being sodium nitrite. In addition to improved disulfide products obtained by the practice of the claimed process wherein nitrite oxidizing agents are employed substantial improvement can be obtained in the quality of disulfides produced employing various oxidizing agents such as hydrogen peroxide and ammonium persulfate as well as other suitable oxidizing agents providing the reactants are mixed together under carefully controlled conditions in accordance with the teachings of this invention. It is preferred that the solution of thiazole salt and soluble oxidizing agent be added to the mineral acid beneath the surface of the reacting mixture at a reasonably fast rate in order to insure fast formation of the disulfides which in turn insures that the disulfides will be in the form of large dense particles which can be dispersed easily and rapidly in rubbers. The thiazole-nitrite solution and the dilute mineral acid solution are brought together in such proportions as to insure, at all times during the reaction, at least a slight excess of acid beyond that which is required to react with the thiazole and nitrite. Generally the reaction mixture will be maintained at a pH between 2 and 5. The exact rate of addition of the thiazole-nitrite salt solution to the mineral acid solution will, however, as explained above, be determined by adjustments which are required to obtain liquid disulfide globules, as determined by microscopic examination, within the specified particle size range. In practicing the process of this invention on a continuous basis the reaction time can range from a few seconds to several minutes, although substantially instantaneous reaction is obtained in the preferred continuous process so that the retention time of any given portion of the reacting solutions in the reactor is normally in the neighborhood of ten to twenty seconds. When the process of this invention is practiced on a batch type operation the reaction time may be slightly longer than for a continuous type reaction but should normally not exceed five to ten minutes after the reactants are mixed together. In either the batch or continuous type reaction the reacting solutions should be maintained under constant controlled agitation in order to avoid agglomeration of the reactants and the disulfide particles which are formed.

The preparation of disulfides in accordance with this invention can be carried out on a batch or continuous basis. In the continuous process a mixture of a salt of a thiazole and a salt of nitrous acid are constantly fed into a continuous stream of a mineral acid while continuously removing the formed disulfides and subsequently recovering the product by any convenient method such as filtration or centrifuging. The rate of addition of acid will be dependent on the rate of addition of the soluble thiazole salt and the soluble nitrite salt, the rates of addition of each component being adjusted to provide for a substantially balanced system so as to bring the reactants together in approximately equal molar proportions. However, a slight excess of acid is desirable and it will normally be preferable to maintain the pH of the reaction mxture between 2 and 5.

The rubbers which can be treated with the disulfides of this invention are the known diene polymers such as natural rubber and the various synthetic diene rubbers which are somewhat similar to natural rubber in their physical and chemical characteristics, such as polychloroprene; cis-1,4-polyisoprene; cis-1,4-polybutadiene; butyl rubber, which is a polymerization product of a major proportion of a mono olefin, such as isobutylene, and a minor proportion of a multiolefin, such as butadiene or isoprene; the rubbery copolymers of butadiene and styrene which may contain from 50 to 75% by weight of butadiene; the rubbery copolymers of butadiene and acrylonitrile; and polyisoprene. The accelerators of this invention are customarily used in a rubber in a proportion of about 0.5% to 5.0% by weight, based on the weight of rubber.

The practice of the invention is illustrated by the following examples which are not intended to be limitations thereon.

*Example 1*

Four hundred and forty milliliters of sodium mercapto benzothiazole solution containing 16.7 grams of mercaptobenzothiazole were mixed with 7 grams of sodium nitrate to provide a clear solution which was thereafter warmed to 70° C. One hundred and ten milliliters of 10% sulfuric acid (approximately .1 mol plus 10% excess) were poured into a 1 liter flask and diluted with 220 milliliters of water and thereafter warmed to 70° C. The acid was stirred continuously while the sodium mercaptobenzothiazole-sodium nitrate solution was added to the acid from a dropping funnel. Portions of the reacting solutions were subjected to microscopic examination using an ordinary light microscope. Employing ordinary light to illuminate the sample, globular shaped droplets of 2,2-bis-benzothiazole disulfide were observed as they were formed by the oxidation of the mercaptobenzothiazole. The rotational speed of the variable speed electric stirrer equipped with an off-center U-shaped glass impeller and the rate of addition of the thiazole solution were adjusted so as to produce globular shaped droplets of 2,2-bis-benzothiazole disulfide wherein the majority of the droplets were between 1 and 7 microns in diameter. The precipitated benzothiazyl disulfide was filtered from the solution, washed and dried to provide 16.6 grams of benzothiazyl disulfide.

As a standard for comparison, benzothiazyl disulfide was prepared according to the conventional nitrite oxidation process. Four hundred and forty milliliters of sodium mercaptobenzothiazole solution containing 16.7 grams of mercaptobenzothiazole was slowly stirred into 50 milliliters of 10% sulfuric acid diluted with 220 milliliters of water. When the mercaptobenzothiazole was completely precipitated, 7 grams of sodium nitrite were added to the slurry which was then heated to 70° C. Thereafter, 55 milliliters of 10% sulfuric acid were added slowly while the slurry was stirred rapidly. The reaction mixture foamed rather badly so it was necessary to add the acid very slowly to prevent loss due to overflowing of the reaction container. The formed benzothiazyl disulfide was filtered and washed to give a yield of 16.6 grams of flaky voluminous product.

Five grams of the benzothiazyl disulfide prepared according to Example 1 were compared with five grams of benzothiazyl disulfide prepared by the conventional nitrite oxidation process.

Each five gram sample was tested on a laboratory rubber mill to determine the dispersibility of each in rubber. It was observed that the products of this invention dispersed much more readily in rubber compounds than did the benzothiazyl disulfides prepared according to prior practices. Similar tests were made by dispersing samples prepared as described in Example 1 in rubber by means of an internal mixer, such as a Banbury mixer. These tests also indicated that the products of this invention disperse much more readily and much more completely than do the products prepared according to the previously known processes.

Other laboratory samples have been prepared as in Example 1 wherein various other thiazole salts were used in place of the sodium mercaptobenzothiazole of Example 1. These products prepared according to the practice of this invention were universally superior in properties of dispersion in rubber to the products made according to prior processes.

The efficacy of this invention has been further demonstrated by means of a bench scale pilot plant operation wherein sodium mercaptobenzothiazole was oxidized to 2,2-bis-benzothiazyl disulfide in a 500 milliliter reactor substantially as described in the accompanying drawing. These bench scale operations were on a continuous basis wherein the sodium mercaptobenzothiazole was dissolved in water and mixed with the sodium nitrite prior to being pumped into the bottom of the reactor simultaneously with feeding dilute sulfuric acid into the reactor from the side at a point near the bottom of the reactor. The acid feed and the thiazole-nitrite feed were controlled to maintain a slightly acidic reaction mixture having a pH between 2 and 4. The feed rate of the solutions and the degree of agitation to which the solutions in the reactor were subjected were also controlled to produce liquid globules of 2,2-bis-benzothiazyl-disulfide in the reaction mixture wherein the majority of the droplets were between 1 and 4 microns in diameter as determined by microscopic examination of the reacting solutions.

In addition to the above examples, the efficacy of this invention has been further emphasized by pilot plant operations wherein a 10-gallon reactor constructed according to the drawing has been operated on a continuous basis at a rate sufficient to produce as much as 18,000 pounds of benzothiazyl disulfide per day. The products produced in the pilot plant reactor exhibited the same desirable characteristics of large uniform particles having a high density as the products made in the laboratory and in the bench scale pilot plant operations. These pilot plant operations are illustrated by Example 2.

*Example 2*

Three thousand gallons of 6% water solution of sodium mercaptobenzothiazole and 190 gallons of 32% sodium nitrite-water solution were mixed together and heated to a temperature of about 65° C. This mixture was initially pumped at a rate of approximately 20 gallons per minute into the bottom of a 10-gallon rubber-lined reactor equipped with a variable speed stirrer. Simultaneously, a 15% solution of sulfuric acid was pumped into the side of the tank at an initial rate of approximately 5 gallons per minute. The rate of flow of the solutions into the reactor and the speed of the variable speed stirrer were adjusted to produce globular shaped droplets of 2,2-bis-benzothiazyl disulfide in the reaction solution wherein the majority of the droplets were between 1 and 4 microns in diameter. The reacting mixture was allowed to substantially fill the reactor after which it was continuously discharged through a line near the top of the reactor as shown in the drawing. After the above described adjustments were made this procedure permitted the reacting solutions to have approximately a twenty second retention time in the reactor which proved to be the optimum reacting time with this equipment in order to obtain a disulfide having the best dispersion properties in rubber. Nitrogen oxides were allowed to escape from a disengaging tank through a vent line and the slurry was pumped to a vacuum filter where the benzothiazyl disulfide was filtered from the mixture and washed. Thereafter, the disulfide was extruded, dried, pulverized, sifted and packaged.

Mill dispersion tests and Banbury dispersion tests showed that the products produced according to the practice of this invention dispersed much faster and more completely in rubber than benzothiazyl disulfides produced according to previously known oxidation processes which did not appreciate the importance of nor provide a method for controlling the size of the disulfide droplets which are formed in the reaction mixture by the oxidation of the thiazole.

In every instance, the products made according to the practice of this invention were vastly superior in properties of dispersion in rubber than any of the similar products made according to the known processes.

While certain representative embodiments and details have been shown for the purpose of illustrating the invention, it will be apparent to those skilled in the art that various changes and modifications may be made therein without departing from the spirit or scope of the invention.

We claim:

1. A process for the preparation of disulfides having enhanced dispersibility in rubber which comprises preparing an aqueous solution containing approximately equal molar proportions of (1) a water-soluble salt of a thiazole selected from the group consisting of 2-mercapto-4,5-dimethyl thiazole, 2-mercapto-4-phenyl thiazole, 2-mercapto-4-methyl-5-carbethoxy thiazole, 2-mercapto-4-methyl-5-acetyl thiazole, 2 - mercaptobenzothiazole, 2 - mercapto naphothiazole, 2-mercapto-5-chlorobenzothiazole and 2-mercapto-6-nitro-benzothiazole wherein the salt forming radical is selected from the group consisting of alkali metals and alkaline earth metals and (2) a nitrite oxidizing agent selected from the group consisting of the water-soluble alkali metal nitrites and the water-soluble alkaline earth metal nitrites and thereafter bringing together the thiazole-nitrite solution and a dilute mineral acid solution in such proportions as to provide at all times during the reaction an excess of acid beyond that which is required to react with the thiazole and nitrite, agitating the reacting solutions at a rate sufficient to disperse the thiazole-nitrite solution in the acid in discrete droplets and adjusting the rate of introduction of the reacting solutions into the reacting zone and the degree of agitation to which said solutions are subjected to produce liquid globules of disulfide wherein the majority of the liquid globules are between 0.5 and 25 microns in diameter.

2. A process in accordance with claim 1 wherein the nitrite oxidizing agent is sodium nitrite.

3. A process in accordance with claim 1 wherein the water-soluble salt of a thazole is sodium 2-mercaptobenzothiazole.

4. A process for the preparation of disulfides having enhanced dispersibility in rubber which comprises preparing an aqueous solution containing approximately equal molar proportions of (1) a water-soluble salt of a thiazole selected from the group consisting of 2-mercapto-4,5-dimethyl thiazole, 2-mercapto-4-phenyl thiazole, 2-mercapto-4-methyl-5-carbethoxy thiazole, 2-mercapto-4-methyl-5-acetyl thiazole, 2 - mercaptobenzothiazole, 2 - mercapto naphthothiazole, 2-mercapto-5-chlorobenzothiazole and 2-mercapto-6-nitro-benzothiazole wherein the salt forming radical is selected from the group consisting of alkali metals and alkaline earth metals and (2) a nitrite oxidizing agent selected from the group consisting of the water-soluble alkali metal nitrites and the water-soluble alkaline earth metal nitrites and thereafter introducing the thiazole-nitrite solution below the surface of a dilute mineral acid solution in such proportions as to provide at all times during the reaction an excess of acid beyond that which is required to react with the thiazole and nitrite, agitating the reaction solutions at a rate sufficient to disperse the thiazole-nitrite solution in the acid in discrete droplets and adjusting the rate of introduction of the reacting solutions into the reacting zone and the degree of agitation to which said solutions are subjected to produce liquid globules of disulfide wherein the majority of the liquid globules are between 0.5 and 25 microns in diameter.

5. A process for the preparation of disulfides having enhanced dispersibility in rubber which comprises continuously introducing a dilute mineral acid solution to a reactor, introducing below the surface of said acid solution a solution containing approximately equal molar proportions of (1) a water-soluble salt of a thiazole selected from the group consisting of 2-mercapto-4,5-dimethyl thiazole, 2-mercapto-4-phenyl thiazole, 2 - mercapto - 4 - methyl-5-carbethoxy thiazole, 2-mercapto - 4 - methyl - 5-acetyl thiazole, 2 - mercaptobenzothiazole, 2 - mercapto naphthothiazole, 2-mercapto-5-chloro benzothiazole and 2-mercapto-6-nitro-benzothiazole wherein the salt forming radical is selected from the group consisting of alkali metals and alkaline earth metals and (2) a nitrite oxidizing agent selected from the group consisting of the water-soluble alkali metal nitrites and the water-soluble alkaline earth metal nitrites while agitating the acid solution at a rate sufficient to disperse the thiazole-nitrite solution in the acid in discrete droplets, the mineral acid solution and thiazole-nitrite solution being brought together in such proportions as to maintain at all times during the reaction an excess of acid beyond that which is required to react with the thiazole and nitrite, adjusting the rate of introduction of the reacting solutions into the reaction zone and the degree of agitation to which said reaction mixture is subjected to produce liquid globules of disulfide wherein the majority of the liquid globules are between 0.5 and 25 microns in diameter.

6. A process in accordance with claim 5 in which the reactor is continuously overflowed and the particles of solid globular disulfide product are removed from the reaction zone in the stream overflowing the reactor.

7. A process in accordance with claim 5 in which the reaction mixture is maintained at a temperature between 40 and 75° C.

8. A process for the preparation of benzothiazyl disulfide having enhanced dispersibility in rubber which comprises preparing an aqueous solution containing approximately equal molar proportions of (1) sodium 2-mercaptobenzothiazole and (2) sodium nitrite and thereafter bringing together the thiazole-nitrite solution and a dilute sulfuric acid solution in such proportions as to provide at all times during the reaction an excess of acid beyond that which is required to react with the thiazole and nitrite, agitating the reacting solutions at a rate sufficient to disperse the thiazole-nitrite solution in the acid in discrete droplets and adjusting the rate of introduction of the reacting solutions into the reaction zone and the degree of agitation to which said solutions are subjected to produce liquid globules of disulfide wherein the majority of the liquid globules are between 0.5 and 25 microns in diameter.

References Cited in the file of this patent

UNITED STATES PATENTS

| | | |
|---|---|---|
| 1,908,935 | Tschunker et al. | May 16, 1933 |
| 2,119,131 | Gracia | May 31, 1938 |

UNITED STATES PATENT OFFICE
CERTIFICATE OF CORRECTION

Patent No. 3,062,825                        November 6, 1962

Albert F. Hardman et al.

It is hereby certified that error appears in the above numbered patent requiring correction and that the said Letters Patent should read as corrected below.

Column 2, line 6, for "oxide" read -- oxidize --; line 16, for "condtions" read -- conditions --; column 4, line 39, for "obtaind" read -- obtain --; column 5, lines 21 and 27, for "nitrate", each occurrence, read -- nitrite --; column 7, line 23, for "naphothiazole" read -- naphthothiazole --; line 44, for "thazole" read -- thiazole --.

Signed and sealed this 20th day of August 1963.

(SEAL)
Attest:

ERNEST W. SWIDER
Attesting Officer

DAVID L. LADD
Commissioner of Patents